United States Patent
Yahiro et al.

[11] Patent Number: 5,745,237
[45] Date of Patent: Apr. 28, 1998

[54] METHOD AND APPARATUS FOR MEASURING CROSS SECTIONAL DIMENSIONS OF SECTIONAL STEEL

[75] Inventors: Kazuhiro Yahiro, Kurashiki; Takayuki Yoshioka, Setagaya-ku; Kazushi Baba, Kurashiki, all of Japan

[73] Assignee: Kawasaki Steel Corporation, Kobe, Japan

[21] Appl. No.: 622,855

[22] Filed: Mar. 29, 1996

[30] Foreign Application Priority Data

Mar. 31, 1995 [JP] Japan .................. 7-074777
Aug. 29, 1995 [JP] Japan .................. 7-220459

[51] Int. Cl.⁶ ..................................... G01B 11/14
[52] U.S. Cl. .................. 356/375; 356/372; 356/387
[58] Field of Search ..................... 356/372, 375, 356/376, 384–387

[56] References Cited

U.S. PATENT DOCUMENTS

| | | | |
|---|---|---|---|
| 3,864,039 | 2/1975 | Wilmarth | 356/372 |
| 3,899,663 | 8/1975 | Pirlet | |
| 4,181,430 | 1/1980 | Shirota et al. | 356/375 |
| 4,198,164 | 4/1980 | Cantor | 356/375 |
| 4,227,812 | 10/1980 | Pirlet | 356/372 |
| 4,227,813 | 10/1980 | Pirlet | 356/372 |
| 4,915,504 | 4/1990 | Thurston | 356/376 |
| 4,932,784 | 6/1990 | Danneskiold-Samsoe | 356/376 |
| 4,959,553 | 9/1990 | Yamada et al. | |
| 5,247,338 | 9/1993 | Danneskiold-Samsoe et al. | 356/376 |
| 5,253,039 | 10/1993 | Fujimoto et al. | 356/376 |

FOREIGN PATENT DOCUMENTS

| | | |
|---|---|---|
| A-2-078741 | 5/1983 | European Pat. Off. . |
| A-2-481496 | 2/1992 | European Pat. Off. . |
| A-60-140107 | 7/1985 | Japan . |
| A-2-254304 | 10/1990 | Japan . |
| A-4-157304 | 5/1992 | Japan . |
| A-6-185988 | 7/1994 | Japan . |
| A-7-27518 | 1/1995 | Japan . |
| A-7-83635 | 3/1995 | Japan . |

*Primary Examiner*—Hoa Q. Pham
*Attorney, Agent, or Firm*—Oliff & Berridge, PLC

[57] ABSTRACT

Cross sectional dimensions of an intermediate product of sectional steel are measured in the course of rolling, by simultaneously, horizontally reciprocating, in the direction transverse to a conveyance line of the sectional steel, two laser range finders which are disposed vertically opposite to each other. The method and apparatus are capable of determining, precisely and automatically, a sectional shape of the H-beam in an on-line manner, thereby improving product quality and yield.

5 Claims, 10 Drawing Sheets

PROFILE OF SPACE COORDINATES $(X_1, Y_1)$

PROFILE OF SPACE COORDINATES $(X_2, Y_2)$

PROFILE OF SPACE COORDINATES $(X_3, Y_3)$

PROFILE OF SPACE COORDINATES $(X_4, Y_4)$

METHOD AND APPARATUS FOR MEASURING CROSS SECTIONAL DIMENSIONS OF SECTIONAL STEEL

BACKGROUND OF THE INVENTION

1. Field of the Invention

The present invention relates to a method and apparatus for measuring the cross sectional dimensions of an intermediate product during the formation of sectional steel in a rolling line for rolling sectional steel such as H-beam, I-beam or channels, all of which include a pair of flanges and a web connecting the flanges.

2. Description of the Related Art

Conventionally, the cross sectional dimensions of sectional steel, particularly H-beam, are mainly manually measured using calipers or a dial gauge because of a variety of shapes. This measurement has the faults that reproducibility is low due to differences among operators, and that much time is required.

In order to remove the faults, various techniques have been developed for automatically measuring the cross sectional dimensions of sectional steel. An example of generally known techniques is a γ-ray penetration system in which radiation is applied to a flange portion and a web portion of H-beam, and the amount of penetrating radiation is measured to determine the thickness from the amount of attenuation. Another example is a spontaneous light emission system in which the light energy spontaneously emitted from a hot rolled steel material is received by a light receiving device to detect the edges of both ends of a flange, and the width of the flange is determined from the distance between the edges. Yet another example is a backlight auxiliary light source system in which a mirror is placed between a flange and a web inside the flanges, the light emitted from a light source is applied to the mirror and reflected by the mirror so as to generate a light flux perpendicular to the flanges, and the light transmitted is detected by a light receiving device.

However, the above conventional automatic measurement systems have various problems.

The γ-ray penetration system has the defect that only the flange thickness and web thickness can be measured, and necessary items such as the web height, the leg length and center deviation cannot be measured, and the drawback of relatively high cost of equipment.

The spontaneous light emission system is limited to a flange width meter, and produces error in detecting the edges due to the effect of temperature drops at both flange ends, and it is thus not possible to make sufficient use of the system.

Unlike the spontaneous light emission system, the backlight auxiliary light source system produces no error due to the effect of the temperature drops. However, this system has the problem that the mirror must be placed close by the H-beam, as well as problems with respect to the complicated apparatus, reliability, maintainability, etc. Although the measurement principle of the apparatus can be applied only to measurement of the flange width, combination with another meter such as a laser range finder permits measurement of the other items. However, this system has a relatively high cost.

Other methods and apparatus for measuring dimensions of sectional steel are disclosed in Japanese Patent Laid-Open Nos. 2-254304 (referred to herein as "Cited Reference 1" hereinafter), 4-157304 (referred to herein as "Cited Reference 2" hereinafter), and 7-27518 (referred to herein as "Cited Reference 3" hereinafter).

Cited reference 1 discloses a measurement apparatus comprising stage mechanisms disposed above and below sectional steel so as to move in horizontal and vertical directions, a plurality of one-dimensional laser range finders provided on the stage mechanisms, and a data processing device for computing the sectional shape of the sectional steel from the detected values of the laser range finders.

Cited Reference 2 discloses a method in which a pair of two-dimensional range finders and a pair of one-dimensional range finders are arranged opposite to each other in the widthwise direction of flanges of H-beam so as to face a flange and a web, respectively, for measuring the vertical distances to the opposite flange by the two-dimensional range finders, and the vertical distances to the opposite web by the one-dimensional range finders. The deviation of the web, flange width and web thickness are computed simultaneously. Cited Reference 3 discloses an apparatus comprising a two-dimensional range finder provided on U-shaped support frames which cover the right and left halves of H-beam and which can be moved in the transverse direction, for measuring the flange width by applying a widthwise slit laser beam to the outside of a flange, and a two-dimensional range finder for measuring a distance by applying a slit laser beam to the upper and lower sides of the flange, the inside of the flange and the upper and lower sides of the web at a predetermined angle perpendicular to the direction of conveyance, so that a sectional shape is determined by using a processor for processing the distance data obtained by detection by each of the laser range finders.

The main objective of the above-described conventional measurement techniques is to measure a section of a final product of H-beam after final rolling by a mill. In this case, a flange portion and a web portion are at right angles to each other in a section of the H-beam. In a section of an intermediate product in the course of rolling, on the other hand, e.g., a section of the H-beam which are passed through a break-down mill before a universal mill, a flange 1f has a taper at an angle α with respect to the web 1w, as shown in FIG. 13. Such a section of an intermediate product can not be measured accurately by the measurement apparatus disclosed in Cited References 1, 2 and 3.

Furthermore, because each of the conventional techniques uses many laser range finders (8 finders in embodiments of Cited References 1 and 2, and 6 finders in Cited Reference 3), the apparatus becomes extremely expensive and the frequency of accidents might be increased.

SUMMARY OF THE INVENTION

The present invention has been developed to solve the above problems of the conventional techniques, and an object to the present invention is to provide a method and apparatus which are capable of measuring cross sectional dimensions of an intermediate product during the formation of sectional steel with high precision, even when the section thereof is not a rectangular shape.

In accordance with one aspect of the present invention, there is provided a method of measuring cross sectional dimensions of an intermediate product of sectional steel in the course of rolling by simultaneously reciprocating horizontally, in the direction transverse to the conveyance direction of the sectional steel, two laser range finders which are disposed opposite to each other in the vertical direction of the sectional steel. The method comprises the steps of irradiating, in forward traveling, the sectional steel with laser beams at predetermined angles from the laser range finders to measure the positions of the laser range finders, the distances to the sectional steel and the irradiation angles; irradiation, in backward running, the sectional steel with the laser beams at angles different from the angles in forward traveling to measure the positions of the laser range finders, the distances to the sectional steel and the irradiation angles; selecting measurement data at the same position on the sectional steel from the obtained measurement data to output space coordinates of a section of the sectional steel so that the selected measurement data agree with each other; and computing data of a shape from the space coordinates.

In accordance with another aspect of the present invention, there is provided an apparatus for measuring cross sectional dimensions of an intermediate product of sectional steel during the course of rolling, comprising an upper laser range finder tiltably provided above the sectional steel, which is passed through a gate-like frame installed to surround a conveyance line of the sectional steel, for measuring the distance to the sectional steel; upper laser beam irradiation angle detecting means for detecting the angle of irradiation of the laser beam from the upper laser range finder; upper laser range finder moving means containing the upper laser range finder and the upper laser beam irradiation angle detecting means so as to be horizontally movable; upper laser range finder position detecting means for detecting the position to which the upper laser range finder is moved; a lower laser range finder tiltably provided below the sectional steel opposite to the upper laser range finder, for measuring the distance to the sectional steel; lower laser beam irradiation angle detecting means for detecting the irradiation angle of laser beam from the lower laser range finder; lower laser range finder moving means containing the lower laser range finder and the lower laser beam irradiation angle detecting means so as to be horizontally movable; lower laser range finder position detecting means for detecting the position to which the lower laser range finder is moved; and a sectional shape computing device for determining a sectional shape profile of the sectional steel from the space coordinates thereof, which are obtained by phase matching between the measurements of the position of the upper laser range finder, the distance to the sectional steel and the irradiation angle and the measurements of the position of the lower laser range finder, the distance to the sectional steel and the irradiation angle during traveling of the upper laser range finder moving means and the lower laser range finder moving means, to compute the cross sectional dimensions of the sectional steel from the sectional shape profile.

In the method and apparatus for measuring cross sectional dimensions of an intermediate product of sectional steel as a measurement object in the course of rolling in accordance with the present invention, the positions of the two laser range finders, which are disposed above and below the sectional steel, the distances to the sectional steel and irradiation angles of the laser beams are measured by horizontally reciprocating the two laser range finders in the direction crossing the conveyance line for the sectional steel, and cross sectional dimensions of the sectional steel are obtained from the sectional shape profile which is determined by phase matching of the measurements. It is thus possible to automatically determine the sectional shape of the sectional steel with high precision in an on-line manner.

Other constructions of the present invention and variation thereof will be made clear form the detailed description below.

DESCRIPTION OF THE PREFERRED EMBODIMENTS

[Embodiment 1]

One embodiment of the present invention relating to H-beam is described in detail below with reference to the drawings.

Figure 12:
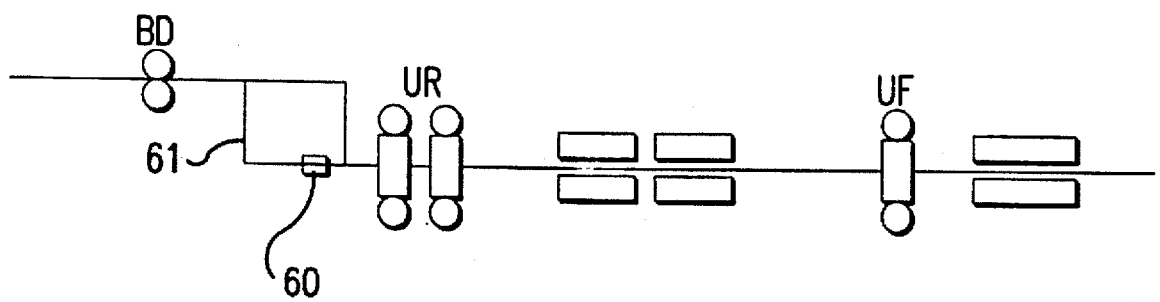
FIG. 12 is a schematic diagram illustrating the arrangement of a production line for producing H-beam in accordance with an embodiment of the present invention.
Figure 13:
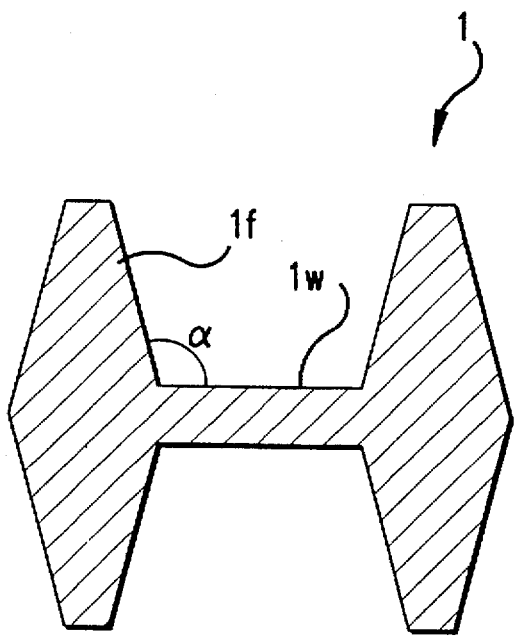
FIG. 13 is a section view of an intermediate product formed during the production of H-beam.

FIG. 12 is a drawing illustrating the arrangement in a line for producing H-beam by using a breakdown mill BD, a rough universal mill UR and a finish universal mill UF. An intermediate product of the H-beam, which was rolled by the breakdown mill BD, is stocked in a skid 61 where the cross sectional dimensions of the sectional steel are measured by a cross sectional dimension measuring device 60, and then sent into the rough universal mill UR.

Figure 1:
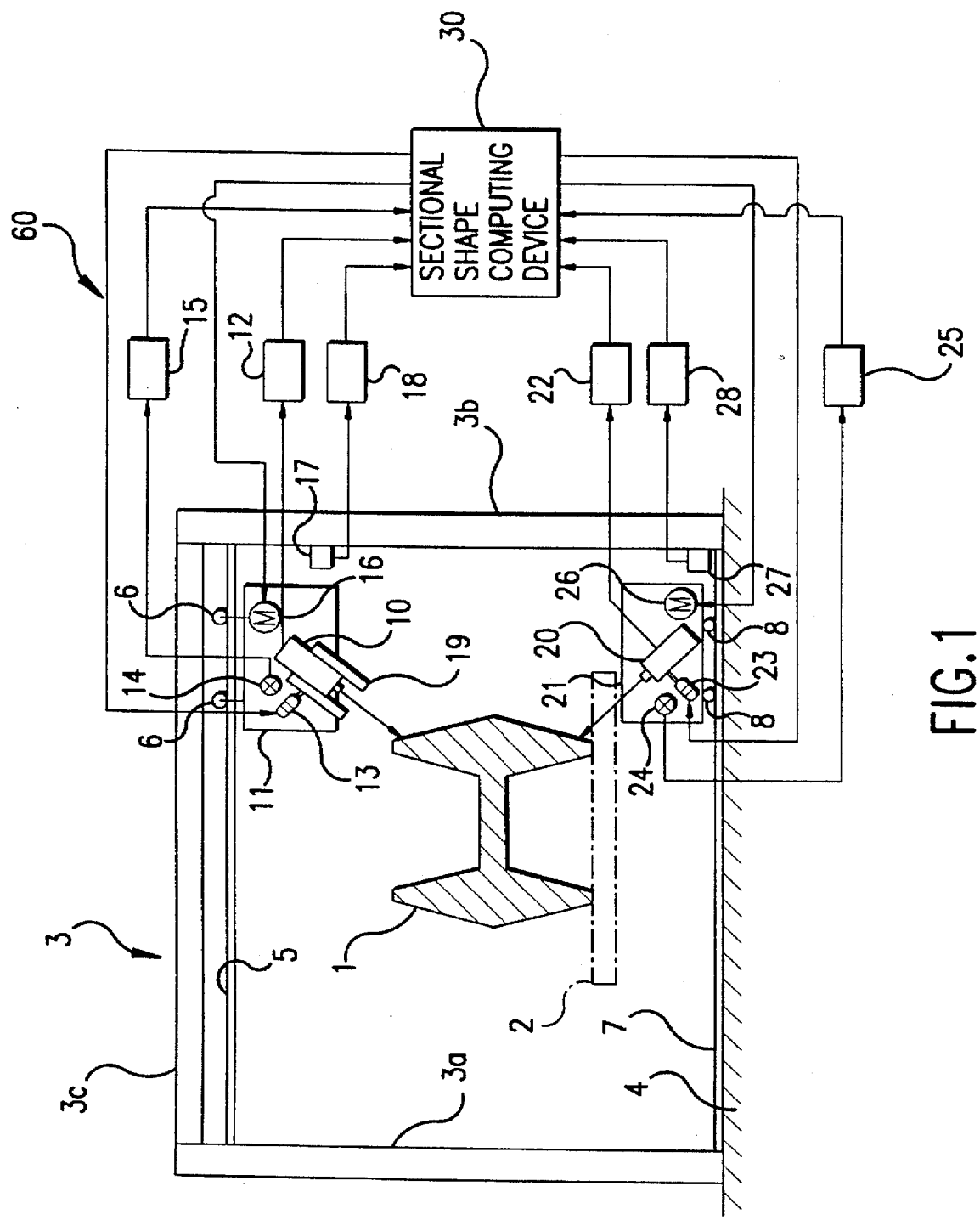
FIG. 1 is a schematic diagram illustrating the construction of a first embodiment of the present invention.

FIG. 1 is a schematic diagram showing the construction of the cross sectional dimension measuring device 60 for measuring an intermediate product of H-beam in accordance with one embodiment of the present invention.

In FIG. 1, reference numeral 1 denotes an intermediate product of H-beam as a measurement object which is conveyed by a conveyance roller 2. Reference numeral 3 denotes a gate-like frame comprising support members 3a and 3b which are erectly provided on a floor 4 so as to hold the conveyance roller 2 therebetween, and a support member 3c placed between the support members 3a and 3b.

Reference numeral 10 denotes an upper laser range finder contained in an upper laser range finder moving device 11 that is suspended by wheels 6 which can be moved on a rail 5 provided on the lower side of the support member 3c in parallel relation therewith. The signal output from the upper laser range finder 10 is input to a range signal processor 12. Irradiation angle adjusting device 13 adjusts the irradiation angle of the upper laser range finder 10. Reference numeral 14 denotes an upper laser beam irradiation angle detector, a signal output therefrom being input to an irradiation angle signal processor 15. Reference numeral 16 denotes a driving device for moving the upper laser range finder moving device 11. Reference numeral 17 denotes an upper laser range finder position detector for detecting the position to which the upper laser range finder is moved, a position signal output from the upper laser range finder position detector 17 being input to a position signal processor 18. A purging device 19 is provided on the upper laser range finder 10 so as to ensure an optical path for a laser beam.

Reference numeral 20 denotes a lower laser range finder contained in a lower laser range finder moving device 21 supported by wheels 8 which can be moved on a rail 7 provided on the floor 4 between the support members 3a and 3b. A signal output from the lower laser range finder 20 is input to a range signal processor 22. Reference numeral 23 denotes an irradiation angle adjusting device for adjusting the irradiation angle of the lower laser range finder 20. Reference numeral 24 denotes a lower laser beam irradiation angle detector, a signal output therefrom being input to an irradiation angle signal processor 25. Reference numeral 26 denotes a driving device for moving the lower laser range finder moving device 21. Reference numeral 27 denotes a lower laser range finder position detector for detecting the position to which the lower range finder 20 travels, a position signal being input to a position signal processor 28.

Reference numeral 30 denotes a sectional shape computing device which computes a sectional shape profile by computing and synthesizing space coordinates of the measurement distances on the basis of the signal output from the range signal processor 12, the irradiation angle signal processor 15, and the position signal processor 18 on the side of the upper laser range finder 10, and the signal output from the range signal processor 22, the irradiation angle signal processor 25, and the position signal processor 28 on the side of the lower laser range finder 20. Sectional shape computing device 30 also output an irradiation angle adjustment signal and a traveling command signal to the irradiation angle adjusting devices 13 and 23 and the driving devices 16 and 26, respectively.

Figure 2:
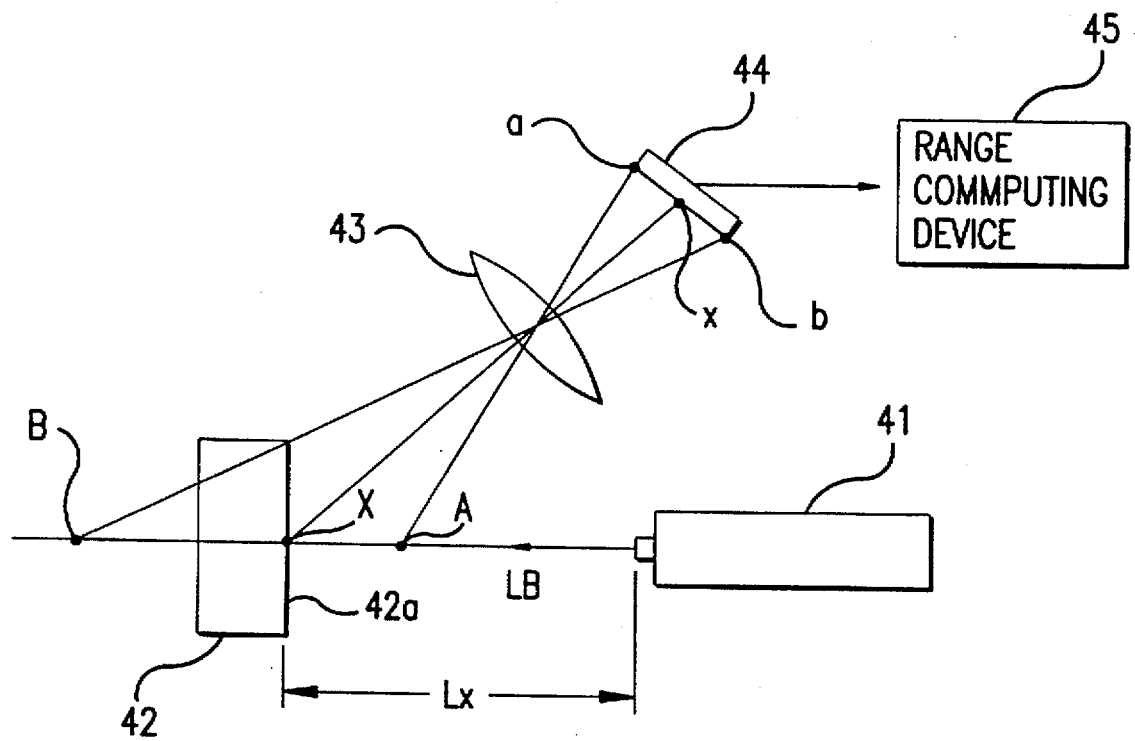
FIG. 2 is a schematic drawing illustrating the measurement principle of a triangulation system laser range finder.
Figure 3:
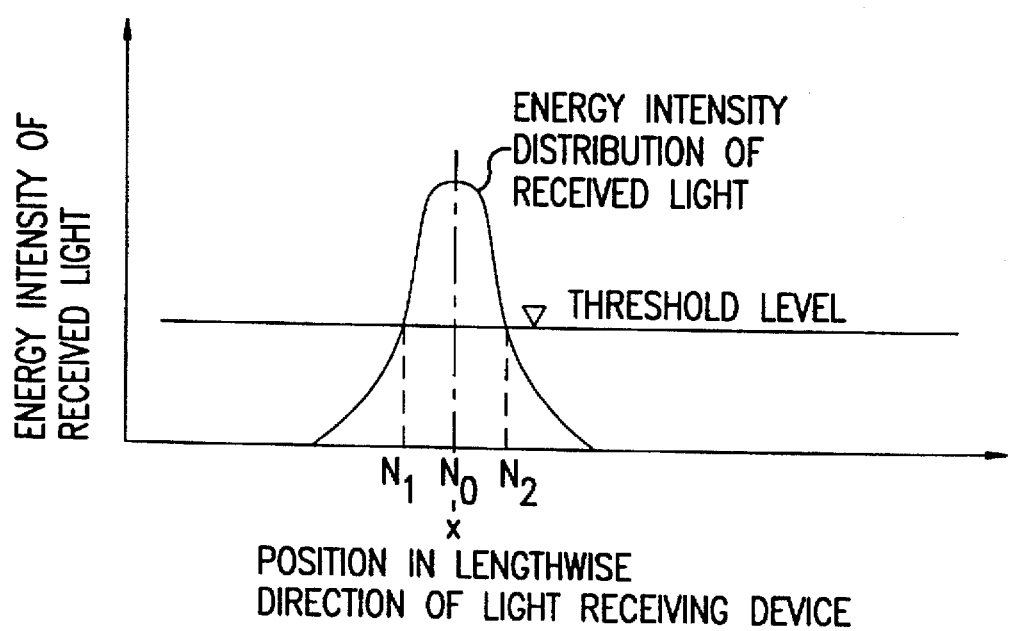
FIG. 3 is a graph illustrating the relation between energy intensity distribution of received light and the detection position.

The operation of the upper and lower laser range finders 10 and 20 is described on the basis of a triangulation system laser range finder as an example. As shown in FIG. 2, laser beam LB is applied to a measurement object 42 from a laser oscillator 41, and the light reflected by a measurement surface 42a of the measurement object 42 is converged by a converging lens 43 to form an image at position x on a light receiving device 44 such as an image sensor. A range computing device 45 determines position X on the measurement object 42 from image formation position x by using the relations between the image formation positions a and b, and the measurement positions A and B, which were previously determined. As shown in FIG. 3, an energy intensity distribution of received light is produced on the light receiving device 44. Generally, center $N_0$ between intersections $N_1$ and $N_2$ of the threshold level and the distribution curve is determined as image formation position x. In this way, the triangulation system laser range finder is able to measure the distance $L_x$ to position X where laser beam LB is reflected.

The procedure for measuring the dimensions of each portion of the section using the cross sectional dimension measuring apparatus of the present invention, constructed as described above, is described with reference to FIGS. 4A–4D.

Figure 4A:
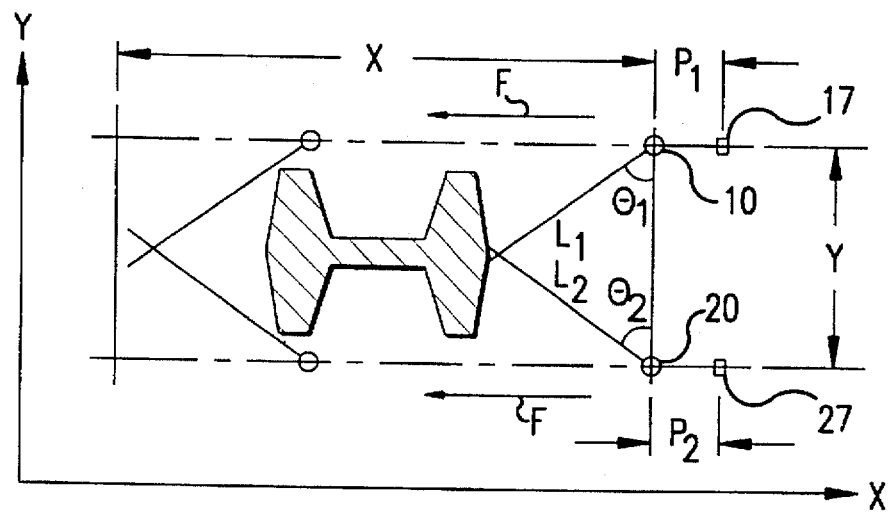
FIGS. 4A to 4D are schematic diagrams illustrating the operation of the present invention.

Step 1; As shown in FIG. 4A, it is assumed that a measurement distance when the upper laser range finder 10 has traveled in the direction shown by arrow F (referred to as "forward traveling" hereinafter) for distance X from measurement position $P_1$, as detected by the upper laser range finder position detector 17, under irradiation of a laser beam at an angle $\theta_1$, is $L_1$, and the measurement distance when the lower laser range finder 20 has traveled in the direction shown by arrow F for distance X from measurement position $P_2$, as detected by the lower laser range finder position detector 27, under irradiation with a laser beam at an angle $\theta_2$, is $L_2$. It is also assumed that the distance between the upper and lower range finders 10 and 20 is Y. Thus, measurement data of the portions which are measured by the upper and lower laser range finders 10 and 20 are represented by x-y space coordinates $(x_1, y_1)$ and $(x_2, y_2)$, respectively. These coordinates are determined according to the following equations (6) to (9):

$$x_1 = X - L_1 \sin \theta_1 - P_1 \tag{6}$$

$$y_1 = Y - L_1 \cos \theta_1 \tag{7}$$

$$x_2 = X - L_2 \sin \theta_2 - P_2 \tag{8}$$

$$y_2 L_2 \cos \theta_2 \tag{9}$$

Figure 4B:
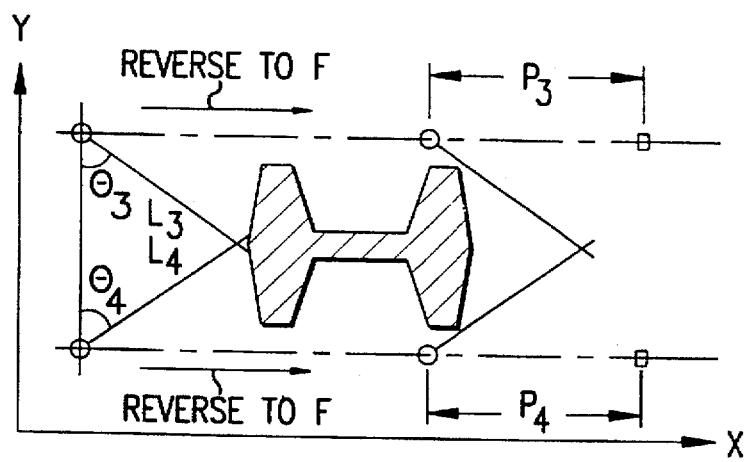

Step 2; as shown in FIG. 4B, the direction of measurement by the upper and lower range finders 10 and 20 is reversed, and the irradiation angles $\theta_1$ and $\theta_2$ are changed to $\theta_3$ and $\theta_4$, respectively, ($\theta_3 \neq \theta_1$ and $\theta_4 \neq \theta_2$). It is assumed that measurement distances when the upper and lower range finders 10 and 20 have traveled in the direction opposite to direction F (referred to as "backward traveling" hereinafter) to positions where the distances measured by the upper and lower laser range finder position detectors 17 and 27 are $P_3$ and $P_4$, respectively, are $L_3$ and $L_4$. Thus, measurement data of the portions which are respectively measured by the upper and lower laser range finders 10 and 20 are represented by x-y space coordinates $(x_3, y_3)$ and $(x_4, y_4)$. These coordinates are determined according to the following equations (10) to (13):

$$x_3 = X + L_3 \sin \theta_3 - P_3 \tag{10}$$

$$y_3 = Y - L_3 \cos \theta_3 \tag{11}$$

$$x_4 = X + L_4 \sin \theta_4 - P_4 \tag{12}$$

$$y_4 = L_4 \cos \theta_4 \tag{13}$$

Figure 4C:
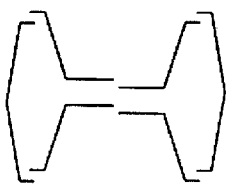
Figure 4D:
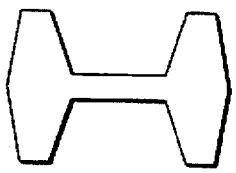

Step 3; as shown in FIG. 4C, phase matching is performed so that the measurement data of the same position on the measurement object in forward traveling agrees with the data in backward traveling. Space coordinates as shown in FIG. 4D are determined to obtain a sectional shape profile.

The profiles obtained by the loci of space coordinates $(x_1, y_1)$, $(x_2, y_2)$, $(x_3, y_3)$ and $(x_4, y_4)$ are summarized in FIGS. 5A to 5D.

Figure 5A:
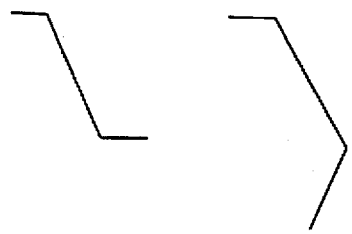
FIGS. 5A to 5D are drawings illustrating the profiles obtained by space coordinates.
Figure 5B:
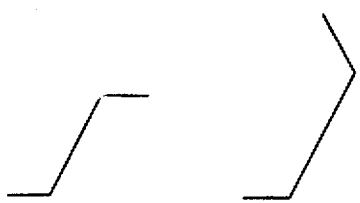
Figure 5C:
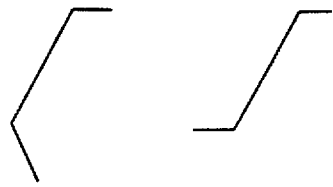
Figure 5D:
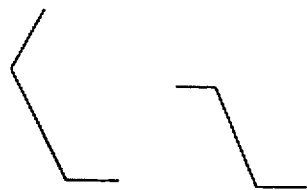

Description will now be made of the procedure for determining a sectional profile by synthesizing the loci of the space coordinates $(x_2, y_2)$, $(x_3, y_3)$ and $(x_4, y_4)$ shown in FIGS. 5B, 5C, and 5D, respectively, on the basis of the locus of the coordinates $(x_1, y_1)$ shown in FIG. 5A.

Specifically, correction amounts $\Delta x_2, \Delta y_2, \Delta x_3, \Delta y_3, \Delta x_4$ and $\Delta y_4$ of the loci of the space coordinates $(x_2, y_2)$, $(x_3, y_3)$ and $(x_4, y_4)$ are first determined, and the space coordinates are converted to the following equations (14), (15), and (16).

$$(x_2, y_2) = (x_2 \Delta x_2, y_2 + \Delta y_2) \tag{14}$$

$$(x_3, y_3) = (x_3 \Delta x_3, y_3 + \Delta y_3) \tag{15}$$

$$(x_4, y_4) = (x_4 \Delta x_4, y_4 + \Delta y_4) \tag{16}$$

(i) Correction amounts $\Delta x_2$ and $\Delta y_2$ are determined according of the following procedure.
(1) Data of measurement at the same position are selected from space coordinates $(x_1, y_1)$ and $(x_2, y_2)$. Namely, n values are extracted from each of the higher-value sides of $x_1$ and $x_2$ to obtain coordinates $(x_1, y_1)_1, (x_1, y_1)_2, \ldots (x_1, y_1)_n$ and $(x_2, y_2)_1, (x_2, y_2)_2, \ldots (x_2, y_2)_n$.
(2) Assuming that when coordinates $(x_1, y_1)_i$ (wherein i=1 to n) have maximum $x_1$ value, set i=j.
(3) Coordinates $x_1, y_1)_i$ where i=1 to j and coordinates $(x, y_1)_i$ where i–j to n are approximated to straight lines by the following equations (17) and (18), respectively:

$$y = a_1 x + b_1 \quad (17)$$

$$y = a_2 x + b_2 \quad (18)$$

(4) The intersection of the two lines shown by equations (17) and (18) is represented by $(x_1, y_1)^*$.
(5) Coordinates $(x_2, y_2)_i$ where i=1 to n, are determined according in the same manners as Steps (2) to (4) to obtain $(x_2, y_2)^*$.
(6) Correction amounts $\Delta x_2$ and $\Delta y_2$ are determined according the following equations (19) and (20), respectively:

$$\Delta x_2 = x_1^* - x_2^* \quad (19)$$

$$\Delta y_2 = y_1^* - y_2^* \quad (20)$$

(ii) Correction amounts $\Delta x_3$ and $\Delta y_3$ are determined according to the following procedure.
(1) Measurement data at the same position are selected from space coordinates $(x_1, y_1)$ and $(x_3, y_3)$. Namely, n values are extracted from each of the higher-value sides of $y_1$ and $y_2$ to obtain coordinates $(x_1, y_1)_1, (x_1, y_1)_2, \ldots (x_1, y_1)_n$ and $(x_3, y_3)_1, (x_3, y_3)_2, \ldots (x_3, y_3)_n$. The n value is determined by the sampling interval and the flange thickness.
(2) The centers of gravity of coordinates $(x_1, y_1)$ and $(x_3, y_3)$ are obtained and represented by $(x_1, y_1)^*$ and $(x_3, y_3)^*$, respectively.
(3) Correction amounts $\Delta x_3$ and $\Delta y_3$ are determined according to the following equations (21) and (22), respectively:

$$\Delta x_3 = x_1^* - x_3^* \quad (21)$$

$$\Delta y_3 = y_1^* - y_3^* \quad (22)$$

(iii) Correction amounts $\Delta x_4$ and $\Delta y_4$ are determined according to the following procedure.
(1) Measurement data at the same position are selected from space coordinates $(x_2, y_2)$ and $(x_4, y_4)$. Namely, n values are extracted from each of the lower-value sides of $y_2$ and $y_4$ to obtain coordinates $(x_2, y_2)_1, (x_2, y_2)_2, \ldots (x_2, y_1)_n$, and $(x_4, y_4)_1, (x_4, y_4)_2, \ldots (x_4, y_4)_n$. The n value is determined by the sampling interval and the flange thickness.
(2) The centers of gravity of coordinates $(x_2, y_2)$ and $(x_4, y_4)$ are obtained and represented by $(x_2, y_2)^*$ and $(x_4, y_4)^*$, respectively.
(3) Correction amounts $\Delta x_4$ and $\Delta x_4$ are determined according to the following equations (23) and (24), respectively:

$$\Delta x_4 = x_2^* - x_4^* + \Delta x_2 \quad (23)$$

$$\Delta y_4 = y_2^* - y_4^* + \Delta y_2 \quad (24)$$

Figure 6:
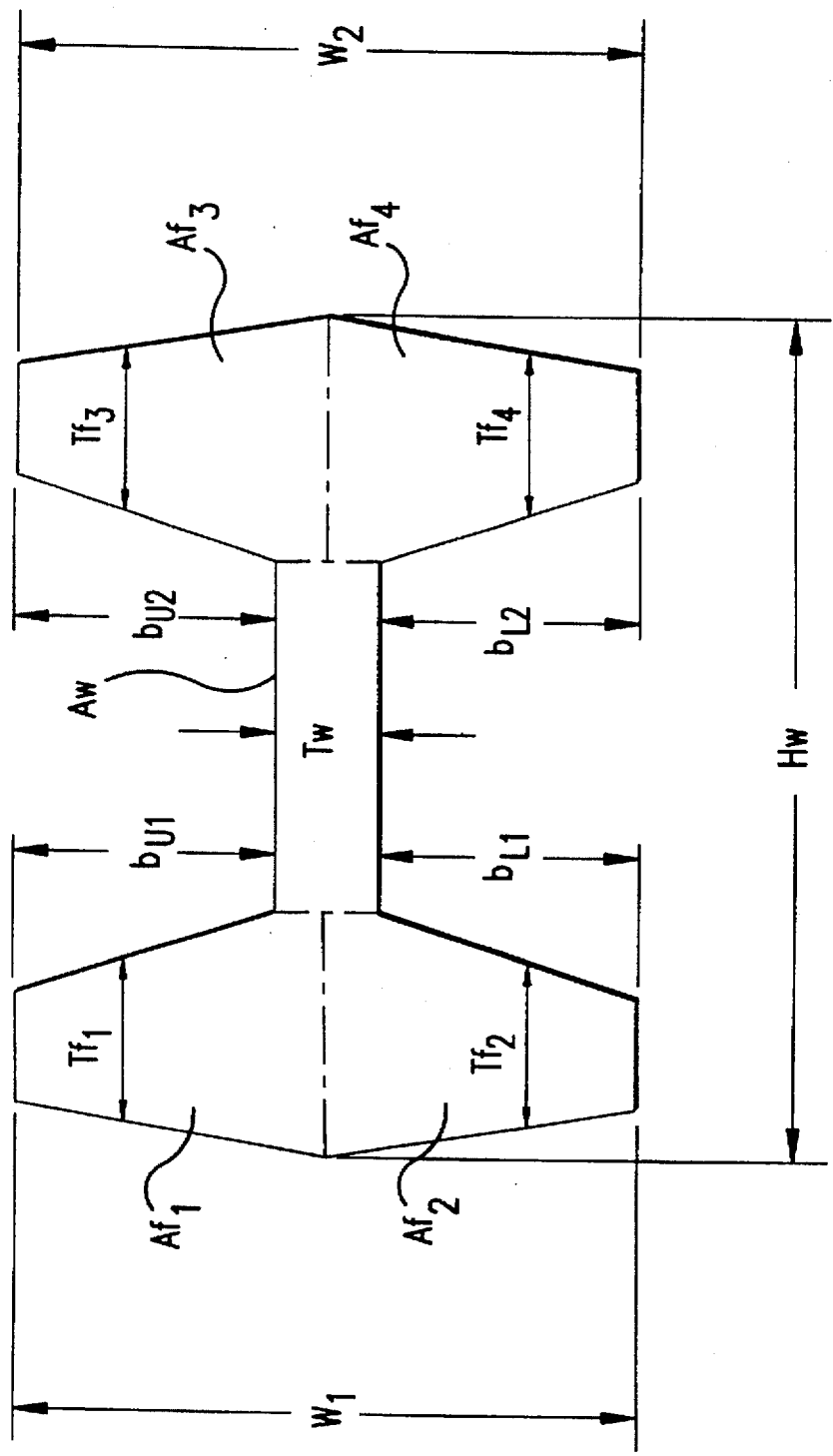
FIG. 6 is a schematic diagram illustrating a method of determining the cross sectional dimensions of each portion of the entire section.

Step 4; By such a division method as shown in FIG. 6 using the sectional profile obtained in Step 3, the sectional areas $A_{f1}, A_{f2}, A_{f3}$ and $A_{f4}$ of the respective flange legs are determined from the lengths $b_{U1}, b_{L1}, b_{U2}$ and $b_{L2}$ of the four legs of the flanges and the thicknesses $T_{f1}, T_{f2}, T_{f3}$ and $T_{f4}$ thereof, and the sectional area $A_W$ of the web is determined from the web thickness $T_W$ and the web height $H_W$.

The sectional areas and lengths of the legs, the flange width and the center deviation are determined according to the following procedure.
(1) The averages $x_{AV}$ and $y_{AV}$ of x and y are obtained by averaging all data of the space coordinates $(x_1, y_1), (x_2, y_2), (x_3, y_3)$ and $(x_4, y_4)$ and used as the origins of the x and y axes.
(2) The coordinates are rewritten to the equation (25) below, and data are converted into the spaces of the first to fourth quadrants of x-y axes:

$$\begin{aligned}(x_1, y_1) &- (x_{AV}, y_{AV}) \\ (x_2, y_2) &- (x_{AV}, y_{AV}) \\ (x_3, y_3) &- (x_{AV}, y_{AV}) \\ (x_4, y_4) &- (x_{AV}, y_{AV}) \end{aligned} \quad (25)$$

(3) In each of the quadrants, data are rearranged in the order of increasing x value.
(4) The web surface and the inner surface of a flange area approximated to straight lines to determine the intersection of the two straight lines.
(5) The sectional area $A_f$ of a leg is determined according to the following equation (26).

$$A_f = \Sigma |y| \times |\Delta x| \quad (26)$$

wherein $\Delta x$ is a difference between adjacent data values.
(6) The lengths $b_{U1}, b_{L1}, b_{U2}$ and $b_{L2}$ of the legs are determined from the maximum value in each quadrant (the minimum value in the second and third quadrants) and the intersection obtained in Step (4). The flange widths $W_1$ and $W_2$ are determined from the difference between the maximum and minimum values.

Center deviations $S_1$ and $S_2$ are obtained by the following equations (27) and (28):

$$S_1 = (b_{U1} + b_{L1})/2 \quad (27)$$

$$S_2 = (b_{U2} + b_{L2})/2 \quad (28)$$

[Embodiment 2]

In some cases, when the coordinates axes are deviated because the irradiation angles of the upper and lower laser range finders 10 and 20 in forward traveling area different from those in backward traveling, in some cases, measurement data at the same position on the measurement object are different. Means for correcting the deviations of the axes is described with reference to a second embodiment.

Figure 7:
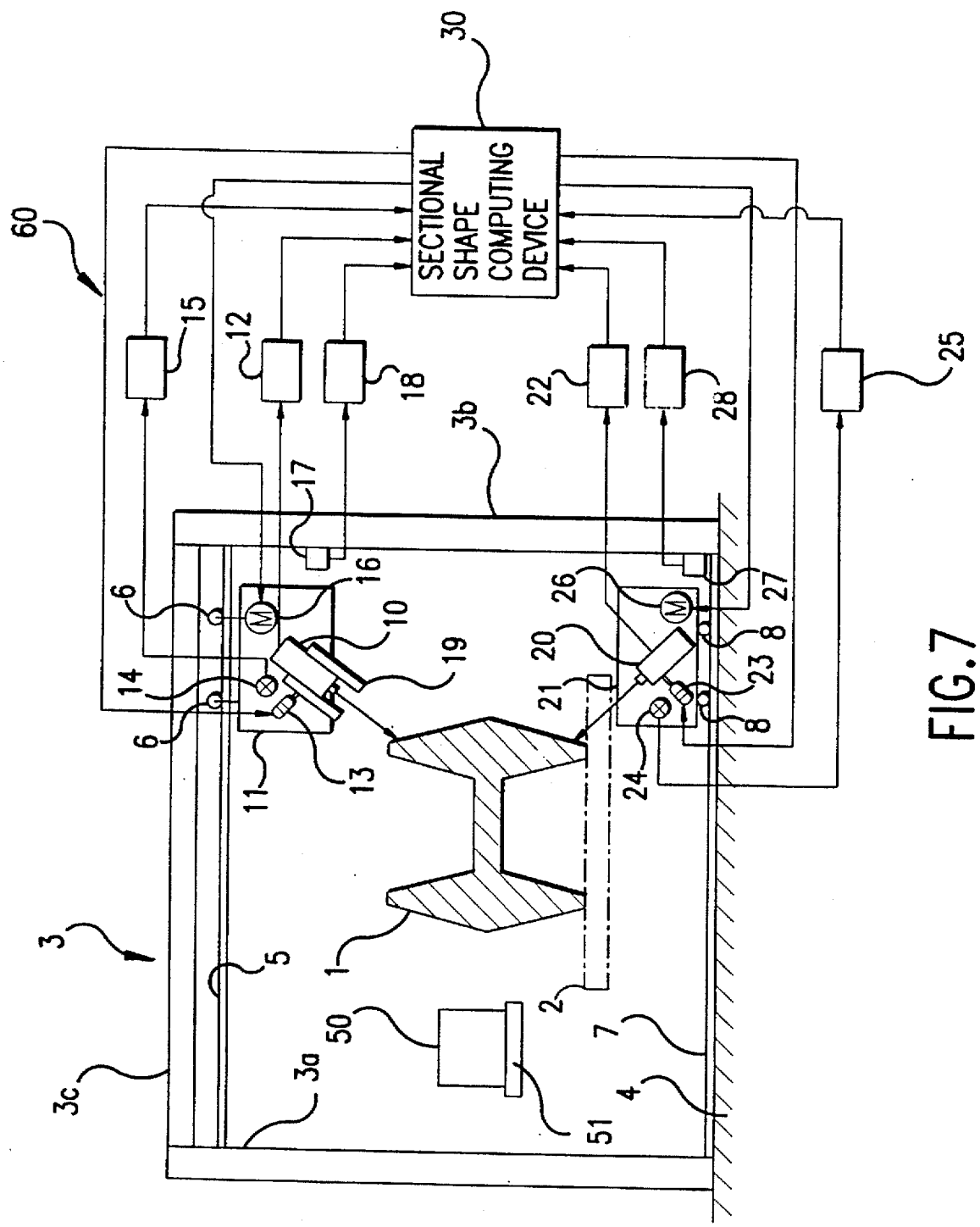
FIG. 7 is a schematic diagram illustrating the construction of a second embodiment of the present invention.
Figure 8:
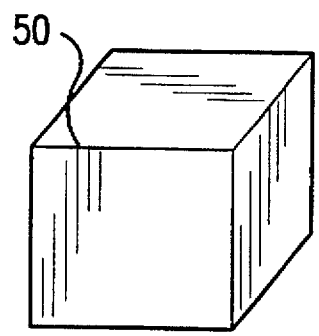
FIG. 8 is a perspective view showing a correction piece used in the present invention.

FIG. 7 shows the construction of the second embodiment of the present invention. This embodiment is different from the first embodiment shown in FIG. 1 in the point that a correction point piece 50 is mounted on a frame 51 by the side of the H-beam 1 as the measurement object. Any object having known cross sectional dimensions may be used as the correction piece 50. For example, a prismatic piece having a square section and surfaces as reference surfaces parallel to the x axis and y axis, as shown in FIG. 8, is described.

Figure 9:
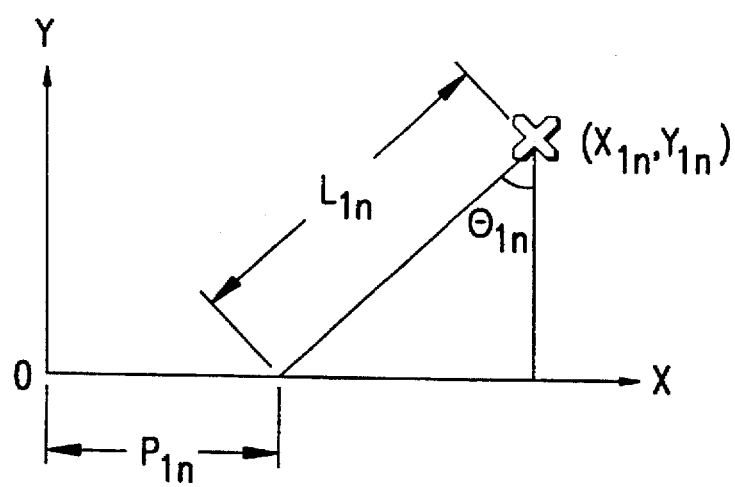
FIG. 9 is a schematic diagram illustrating measuring coordinates of a correction piece.

Measurement data of the position signals $P_{1n}$ and $P_{2n}$ obtained by the upper and lower laser range finder position detectors 17 and 27, and the angle signals $\theta_{1n}$ and $\theta_{2n}$ obtained by the upper and lower laser beam irradiation angle detectors 14 and 24, which are detected at the same time as the distance measurement by the upper and lower laser range finders 10 and 20, are represented by x-y space coordinates $(x_{1n}, y_{1n})$ and $(x_{2n}, x_{2n})$ at each measurement point (refer to FIG. 9). The coordinates are determined by the following equations (29) to (32), assuming that the angle signals $\theta_{1n}$ and $\theta_{2n}$ are the same as the angle signal $\theta_1$ and $\theta_2$ of the H-beam 1:

$$x_{1n} = P_{1n} + L_{1n} \sin \theta_{1n} \qquad (29)$$

$$y_{1n} = L_{1n} \cos \theta_{1n} + K_n \qquad (30)$$

$$x_{2n} = P_{2n} + L_{2n} \sin \theta_{2n} \qquad (31)$$

$$y_{2n} = L_{2n} \cos \theta_{2n} \qquad (32)$$

where n is a number corresponding to the time-series sampling period in measurement, $\theta_n$ is a term for correcting the y axis of the upper laser range finder 10 on the basis of the lower laser range finder 20.

Figure 10A:
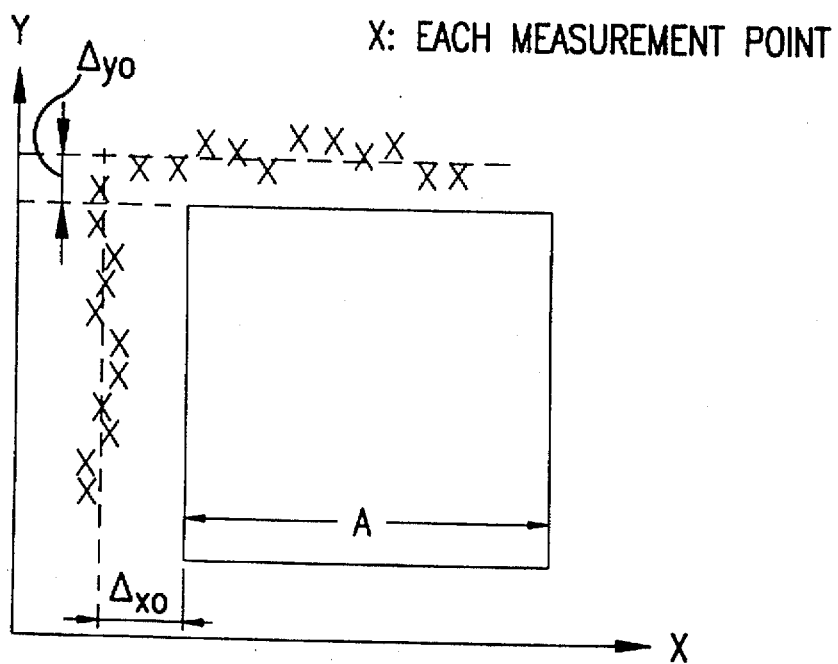
FIGS. 10A and 10B are characteristic drawings illustrating deviations of a measured profile of a correction piece.

Measurement points on correction surfaces of the correction piece 50 parallel to the x axis and y axis, which are fixed at absolute positions, are extracted based on the position signals $P_{1n}$ and $P_{2n}$ and the angle signals $\theta_{1n}$ and $\theta_{2n}$ refer to FIG. 10A).

It is preferred to secure at least 10 measurement points per surface of the correction piece 50. Therefore, the length h of each of the sides parallel to the direction of forward movement and backward movement of the upper and lower laser range finders 10 and 20 is preferably determined according to the following equation (33):

$$h \geq 10 \times V_{max} / T_{min} \qquad (33)$$

wherein $V_{max}$ is the maximum moving speed of each of the laser range finders, and $T_{min}$ is the minimum time for data sampling.

Since the measurement points on each of the surfaces of the correction piece 50 contain error due to the laser range finders and other machines in the x-y directions, and even profile cannot be obtained by connecting the measurement points. The y coordinates at the measurement points on a correction surface in parallel to the x-axis are averaged to determine deviation $\Delta y_0$ from coordinate $y_0$ of the reference y axis. The same processing is performed for a surface parallel to the y axis to determine deviation $\Delta x_0$.

These deviations $\Delta y_0$ and $\Delta y_0$ are calculated as $\Delta y_1$ and $\Delta y_1$ for each laser range finder or each measurement condition to correct measurement coordinates. The corrected measurement points are connected by a line in the order of sampling to form a profile. When the profiles for the laser range finders or measurement conditions are drawn in the same x-y coordinates, the profiles of the same measurement surface coincide with each other, thereby obtaining a sectional profile with high precision.

Figure 10B:
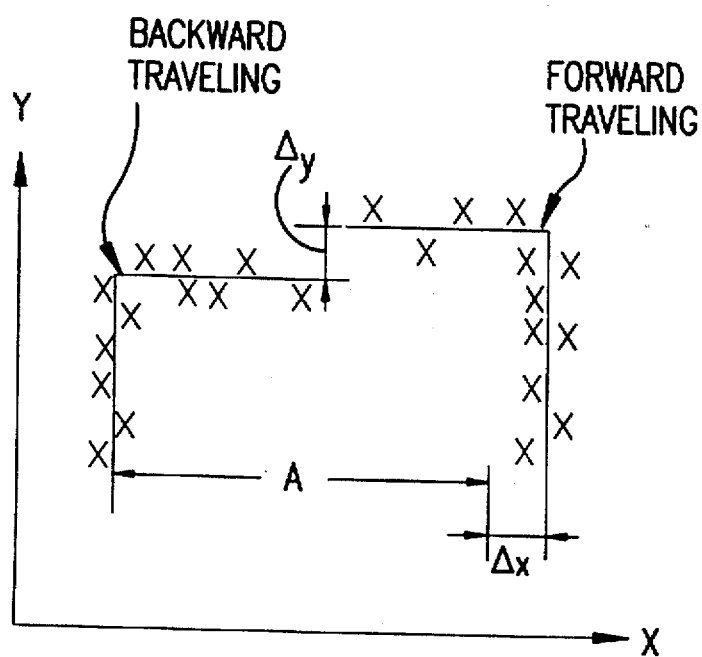

If, in measurement of the correction piece 50, the coordinate axes of a surface profile measured while forward traveling deviate from the axes while backward traveling, each of the deviations $\Delta x$ and $\Delta y$ may be determined so as to correct the measurement coordinates, as shown in FIG. 10B.

Figure 11A:
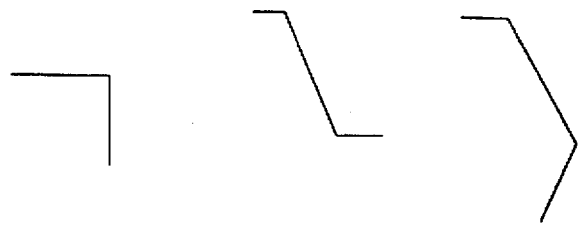
FIGS. 11A–11D are drawings illustrating sectional shape profiles obtained in each step.
Figure 11B:
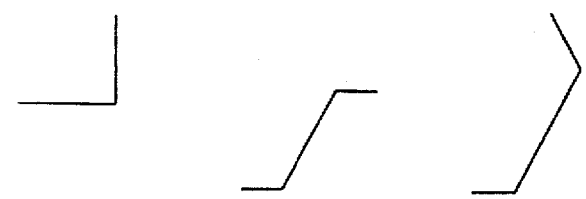
Figure 11C:
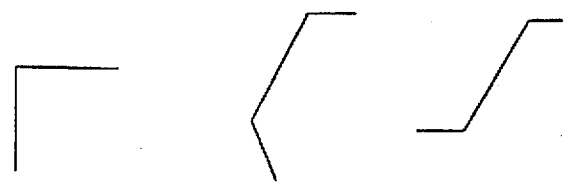
Figure 11D:
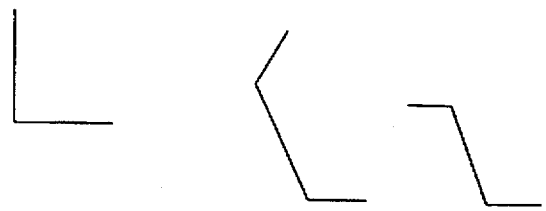

FIGS. 11A–11D show the measured profiles of the H-beam 1 and the correction piece 50 obtained by reciprocating the upper and lower laser range finders 10 and 20. FIG. 11A shows profiles obtained by forward traveling of the upper laser range finder 10; FIG. 11B shows profiles obtained by forward traveling of the lower laser range finder 20; FIG. 11C shows profiles obtained by backward traveling of the upper laser range finder 10; and FIG. 11D shows profiles obtained by backward traveling of the lower laser range finder 20.

Deviations $\Delta x$ and $\Delta y$ which indicate offset amounts in the x- and y-axis directions are determined from the measured profiles of the correction piece 50, and then used for correcting the space coordinates $(x_1, y_1)$, $(x_2, x_2)$, $(x_3, y_3)$ and $(x_4, y_4)$ in the first embodiment. A satisfactory sectional shape profile can then be synthesized.

Thus, in summary, in the method and apparatus for measuring cross sectional dimensions of H-beam of the present invention, the cross sectional dimensions are measured while horizontally reciprocating two laser range finders which are disposed above and below the H-beam opposite to each other. It is thus possible to precisely automatically determine a sectional shape of the H-beam in an on-line manner, thereby significantly contributing to improvements in product quality and yield.

What is claimed is:

1. A method of measuring cross sectional dimensions of an intermediate product of sectional steel during the course of rolling by simultaneously horizontally reciprocating two laser range finders which are disposed opposite to each other in a vertical direction of the sectional steel, the laser range finders reciprocating in a direction crossing a conveyance line of the sectional steel, comprising the steps of:

irradiating said sectional steel with a laser beam at a predetermined angle from each of said laser range finders to measure a first plurality of positions of said laser range finders, a first plurality of distances to said sectional steel and a first plurality of irradiation angles in forward traveling, the predetermined angle being in relation to the vertical direction of the sectional steel;

irradiating said sectional steel with a laser beam at an angle different from the predetermined angle in forward traveling to measure a second plurality of positions of said laser range finders, a second plurality of distances to said sectional steel and a second plurality of irradiation angles in backward traveling;

selecting measurement data at a position on said sectional steel from the measurement data obtained to output space coordinates of a section of said sectional steel so that the selected measurement data for the position coincide with each other; and computing shape information from the space coordinates.

2. A method of measuring cross sectional dimensions of sectional steel according to claim 1, further comprising the steps of:

disposing a correction piece having known cross sectional dimensions adjacent said intermediate product of sectional steel;

measuring a third plurality of distances to said correction piece while horizontally reciprocating said laser range finders;

determining, from the correction piece measurement data obtained, deviations between space coordinates obtained during the forward and backward movements of said laser range finders; and correcting the space coordinates of said sectional steel by using the deviations of the space coordinates.

3. The method of measuring cross sectional dimensions of sectional steep according to claim 2, wherein said sectional steel is H-beam.

4. The method of measuring cross sectional dimensions of sectional steel according to claim 1, wherein said sectional steel is H-beam.

5. An apparatus for measuring cross sectional dimensions of sectional steel comprising:

a frame, the frame at least partially surrounding a conveyance line of sectional steel;

an upper laser range finder tiltably provided at an upper portion of the frame, said upper laser range finder generating a first laser beam and being capable of determining a distance to said sectional steel;

upper laser beam irradiation angle detecting means for detecting a first irradiation angle of the first laser beam generated by said upper laser range finder;

upper laser range finder moving means supporting said upper laser range finder and said upper laser beam irradiation angle detecting means, said upper laser range finder moving means being movable in a horizontal direction that is transverse to said conveyance line;

upper laser range finder position detecting means for detecting a position to which said upper laser range finder is moved;

a lower laser range finder tiltably provided at a lower portion of said frame opposite to said upper laser range finder, said lower laser range finder generating a second laser beam and being capable of determining a distance to said sectional steel;

lower laser beam irradiation angle detecting means for detecting a second irradiation angle of the second laser beam generated by said lower laser range finder;

lower laser range finder moving means supporting said lower laser range finder and said lower laser beam irradiation angle detecting means, said lower laser range finder moving means being movable in a horizontal direction that is transverse to said conveyance line;

lower laser range finder position detecting means for detecting a position to which said lower laser range finder is moved; and sectional shape computing means for determining a sectional shape profile of said sectional steel from space coordinates, said space coordinates being obtained based on phase matched measurements of the positions of said upper and lower laser range finders, distances to said sectional steel, and irradiation angles of said upper and lower laser range finders as said upper and lower laser range finder moving means reciprocates transverse to said conveyance line.

* * * * *